United States Patent [19]

Ootsuki et al.

[11] Patent Number: 4,989,831
[45] Date of Patent: Feb. 5, 1991

[54] COUPLING DEVICE

[75] Inventors: Noboru Ootsuki, Akashi; Toshihiko Oonishi, Kakogawa; Katsumi Tomioka, Kobe; Kouzou Miura, Hiroshima, all of Japan

[73] Assignees: Nippon Air Brake, Kobe; Hirotec Corporation, Hiroshima, both of Japan

[21] Appl. No.: 535,590

[22] Filed: Jun. 8, 1990

[30] Foreign Application Priority Data

Mar. 6, 1990 [JP] Japan ................................ 2-22562

[51] Int. Cl.⁵ .............................................. F16L 37/28
[52] U.S. Cl. .................................. 251/149.7; 137/116; 137/312
[58] Field of Search ............ 137/115, 116, 312, 614.03; 251/149.6, 149.7

[56] References Cited

U.S. PATENT DOCUMENTS

| | | | |
|---|---|---|---|
| 2,265,267 | 12/1941 | Cowles | 251/149.6 |
| 2,680,447 | 6/1954 | Groves | 137/116 |
| 2,787,127 | 4/1957 | Benz | 137/312 |
| 3,777,771 | 12/1973 | De Visscher | 251/149.6 |
| 4,408,521 | 10/1983 | Schelli et al. | 251/149.7 |
| 4,614,201 | 9/1986 | King et al. | 137/312 |

Primary Examiner—A. Michael Chambers
Attorney, Agent, or Firm—Kanesaka & Takeuchi

[57] ABSTRACT

A coupling device includes a first coupling section having a large bore, a small bore, and a valve seat between the large and small bores; a second coupling section having a second bore opening at a contact surface which is opposed to the first coupling section; a valve having a valve head normally resting on the valve seat and a tubular body snugly fitted in the small bore and having an axial opening with a mouth at an end and a plurality of radial openings at the other end; a drain passage provided along the small bore and having an end opening at a bottom of the large bore and the other end opening at a lower side of the first coupling section; and a drain valve provided in the drain passage and having a cylindrical hole intersecting the drain passage and a piston snugly fitted in the cylindrical hole and having a circumferential channel for opening the drain passage and a land portion for closing the drain passage.

5 Claims, 10 Drawing Sheets

COUPLING DEVICE

BACKGROUND OF THE INVENTION

1. Field of the Invention

The present invention relates to coupling devices for coupling fluid passages of a machine such as a press or injection molding machine.

2. Description of the Prior Art

A coupling device of this type, which is disclosed in Japanese U.M. Patent Application Kokai No. 60-167,888, is shown in FIG. 11. A coupling device 53 attached to a first member 50 is useful for connecting the first bore 54 to the second bore 54' of a second member 55. The coupling device 53 consists Of a body 51 and a valve 52 snugly fitted in the body 51. The body 51 has a large bore 56 communicating with the first bore 54 and a small bore 57 in which the valve 52 slidably fitted. A truncated conical surface 58 between the large bore 56 and the small bore 57 serves as a valve seat.

The valve 52 has a tubular body 70 and a valve head 63 secured to an end wall 73 (with inner and outer surfaces 71 and 72) of the tubular body 70 (with inner and outer surfaces 76 and 77). The valve head 63 is pressed against the valve seat 58 by a compression spring 64 which is provided in the large bore 56. The valve head 63 has a gasket 62 secured to the end wall 73 with a bolt 74. The tubular body 70 has an opening 60 which communicates with the large bore 56 when the valve head 63 leaves the valve seat 58. An axial fluid passage 59 communicating with the opening 60 opens at a front end 75 of the tubular body 70 to form a mouth. An annular elastic gasket 61 is bonded to an annular front surface 78 of the tubular body 70.

In operation, the flow of compressed air from the first bore 54 is blocked in the large bore 56 by the seal made by the valve head 63 and the valve seat 58. When the first member 50 is moved toward the second member 55, the elastic gasket 61 of the valve 52 abuts upon a contact surface 65 of the second member 55. If the force applied to the first member 50 is greater than the sum of the pressure of the compressed air and the push of the compression spring 64, the valve 52 is moved rearwardly with respect to the body 51. Since the gasket 62 of the valve head 52 leaves the valve seat 58, the opening 60 of the tubular body 70 starts to communicate with the large bore 56. As a result, the pressure of compressed air on the valve head 63 disappears, leaving only the push of the compression spring 64.

When the first member 50 is further moved toward the second member 55, the degree of communication between the opening 60 and the large bore 56 increases with the traveling distance of the first member 50. When an edge 66 of the opening 60 reaches the large bore 56, the coupling between the first and second bores 54 and 54' is completed.

When there is no coupling action for a long period of time, the vapor of the compressed air remained in the large bore 56 condenses on the inner surface of the large bore and/or the compression spring 64, forming a considerable amount of "drain" in the large bore 56. An example is a case where the metal mold of a press and external conduits are replaced. The press generally has several extruding cylinders for taking a molding from the metal mold in which air passages to the cylinders are provided. The number of extruding cylinders depends on the type and shape of a molding and thus the metal mold to be replaced. Consequently, the number of coupling devices used for the press should be equal the maximum number of cylinders for the metal mold. When the number of cylinders is small, there are some unused coupling devices, in which drains accumulate. When such coupling devices are used, the drains enter the air passages of the metal mold, eroding the passages, causing clogs and impairing the operation of the extruding cylinders.

SUMMARY OF THE INVENTION

Accordingly, it is an object of the invention to provide a coupling device which is free from the above problem.

According to the invention there is provided a coupling device which includes a first coupling section to be attached to a first member with a first bore and a second coupling section to be attached to a second member having a second bore with a mouth on a contact surface which is opposed to the first coupling section. The first coupling section consists of a body having a large bore, a small bore, and a valve seat between the large and small bores and a valve having a tubular body snugly fitted in the small bore and a valve head normally resting on the valve seat. The tubular body has an axial fluid passage with a mouth at an end and a plurality of radial openings such that when the valve head leaves the valve seat, they communicate with the large bore.

In accordance with the invention, a drain passage is provided along the small bore for connecting the large bore and a discharge port provided at a lower side of the body and a drain valve provided in the drain passage which consists of a cylindrical hole formed in perpendicular to the drain passage and a piston which is snugly fitted in the cylindrical hole. The piston has a circumferential channel for opening the drain passage and a land portion for closing the drain passage.

The cylindrical hole has at an end a pilot compartment communicating with the small bore via an orifice and at the other end a spring compartment in which a compression spring is provided for biasing the piston. When the valve head leaves the valve seat, the compressed air flows into the pilot compartment via the orifice and moves the valve head against the action of the spring to open the drain passage. When the valve head rests on the valve seat and the pilot compartment communicates with atmosphere via the orifice, the piston is moved by the action of the spring to close the drain passage.

The piston is provided with a throttle passage which connects the pilot compartment with the spring compartment so that when the orifice is closed by the tubular body, the compressed air in the pilot compartment is gradually discharged by the action of the compression spring so that the piston is held in the open position for a predetermined time for permitting drain discharge. A rod is provided at the end of the piston to extend through a vent so that the piston is moved manually with the rod to control the opening of the drain passage. The drain port is provided with a coupling for connecting a pipe to directing the drain discharge.

By moving the piston to open the drain passage via the circumferential channel, the drain is quickly discharged from the drain port under the pressure of compressed air so that little or no harmful drain remains in the body. When the valve head leaves the valve seat, the compressed air flows in the pilot compartment via the orifice to push the piston against the action of the compression spring to open the position. When the valve head rests on the valve seat, the pilot compartment is connected to atmosphere via the orifice so that the piston is moved by the action of the spring to close the drain passage. In this way, the piston is moved in synchronism with the coupling action of the valve to automatically discharge the drain from the body.

A throttle passage is provided through the piston between the pilot and spring compartments so that when the orifice is closed by the tubular body, the compressed air is discharged by the action of the spring in a time period which is determined by the volume of the pilot compartment and the cross sectional area of the throttle passage. Consequently, the piston is held at the open position for a sufficient time to discharge all of the drain from the body.

With the manual control consisting of a rod extending from the end of the piston, it is possible to move the piston at will to open the drain passage for discharging the drain from the body if necessary. With the drain port provided at a lower side of the body for connection to an external pipe, it is possible to prevent the drain discharge from being spread in atmosphere.

The above and other objects, features, and advantages of the invention will be more apparent from the following description when taken in conjunction with the accompanying drawings.

DESCRIPTION OF THE PREFERRED EMBODIMENT

Figure 1:
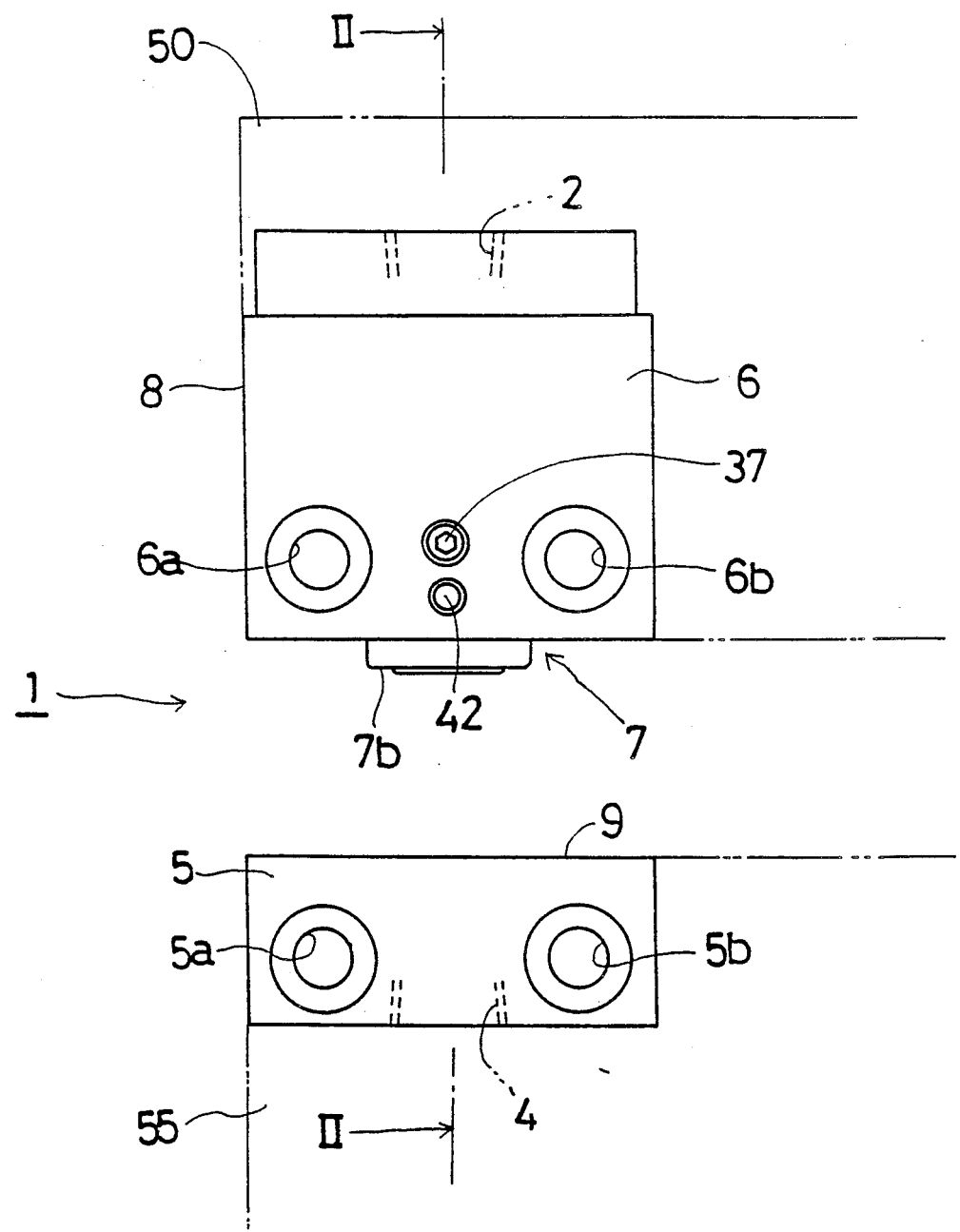
FIG. 1 is a front view of a coupling device according to an embodiment of the invention.

In FIG. 1, a coupling device 1 according to an embodiment of the invention consists of a first coupling section 8 secured to a first member 50 with bolts 6a and 6b and a second coupling section 5 secured to a second member 55 with bolts 5a and 5b. The first coupling section 8 has a body 6 and a valve 7 slidably fitted in the body 6. The second coupling section 5 has a fluid passage 4 opening on a contact surface 9 which is opposed to a front end 7b of the valve 7.

Figure 2:
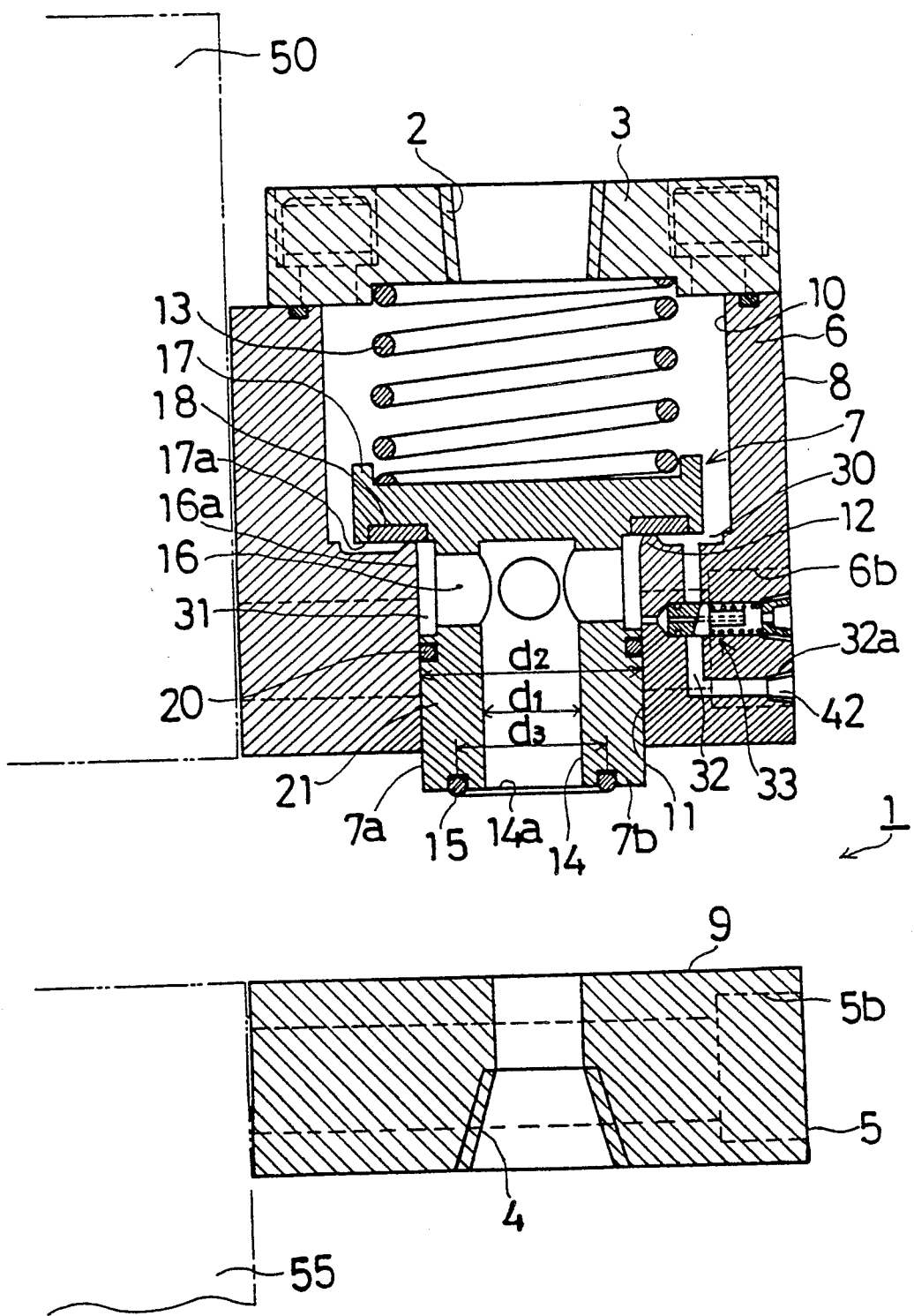
FIG. 2 is a sectional view taken along the line II—II of FIG. 1, wherein the first and second coupling sections are separated.

In FIG. 2, the rear end of the body 6 is closed 10 with a cover 3 with a fluid passage 2 which is to be connected to an external pipe. The body 6 has a large bore 10 communicating with the fluid passage 2 and a small bore 11 in which a tubular body 21 of the valve 7 is slidably fitted. An annular valve seat 12 is provided between the large bore 10 and the small bore 11. A compression spring 13 is provided in the large bore 10 to press an annular gasket 18 of the valve 7 against the valve seat 12. An annular collector recess 30 is provided to reduce the width of the valve seat 12, thus increasing the pressure per unit area of the compressed air on the valve seat 12. The push of the compression spring 13 should be sufficient to press the valve head 17 against the valve seat 12 when no air pressure acts on the large bore 10.

The valve 7 has a tubular body 21 slidably fitted in the small bore 11 and a valve head 17 secured to the tubular body 21 at right angles. The tubular body 21 has four radial openings 16 adjacent the valve head 17 and an axial fluid passage 14 which opens at a front end 7b of the valve 7. A circumferential recess 31 is provided on the tubular body 21 to connect respective mouths 16a of the radial openings 16 so that even when the space between the traveling valve head 17 and the valve seat 12 is less than the diameter of the radial openings 16, the large bore 10 and the axial passage 14 are fully connected. An elastic gasket 20 is provided on the tubular body 21 to prevent the escape of compressed air. An elastic gasket 15 having a gasket diameter $d_3$ which is greater than the inside diameter $d_1$ but less than the outside diameter $d_2$ of the tubular body 21 is mounted on the front end 7b of the valve 7 so that the front end 7b is pressed against the contact surface 9 of the second coupling section 5 under the pressure which is proportional to a difference in area between the outside diameter $d_2$ and the gasket diameter $d_3$.

According to the invention, a drain mechanism is incorporated to discharge the drain deposited in the large 10 bore 10 of the body 6. A drain passage 32 is provided at one end to communicate with the collector recess 30 for collecting drains which deposit on the large bore 10. The other end of the drain passage 32 forms a drain port 42. A drain valve 33 is provided in the middle of the drain passage 32 to control discharge of the drain.

Figure 4:
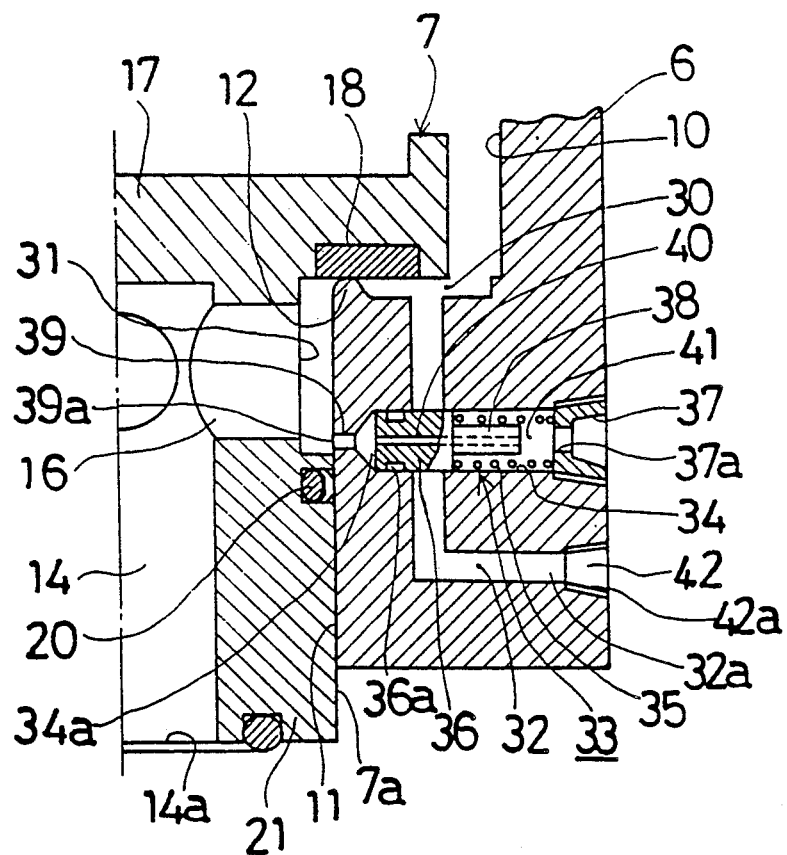
FIG. 4 is a sectional view of a drain valve useful for the coupling device of FIG. 1.
Figure 4:
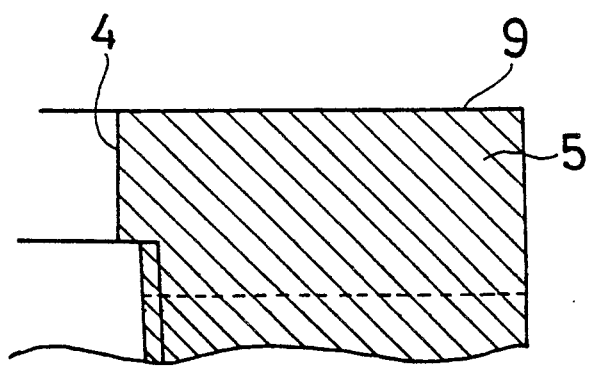

In FIG. 4, a cylindrical hole 34 is formed to intersect the drain passage 32 at right angles. A piston 36 having a circumferential channel 36a and a land portion 36b is slidably fitted in the cylindrical hole 34. A pilot chamber 34a communicates with the small bore 11 via an orifice 39. A compression spring 35 is provided in a spring compartment 41 between the piston 36 and a plug 37 having a vent 37a through which the spring compartment 41 communicates with atmosphere.

Figure 5:
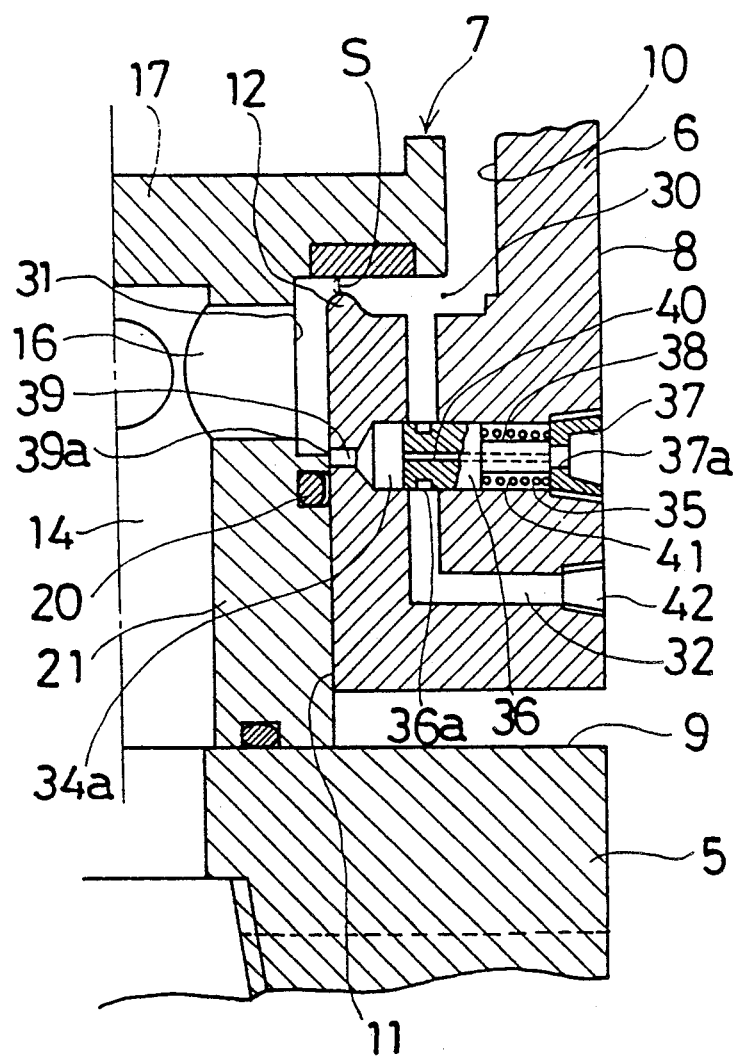
FIG. 5 is a sectional view of the drain valve of FIG. 4, wherein the drain passage is opened.
Figure 6:
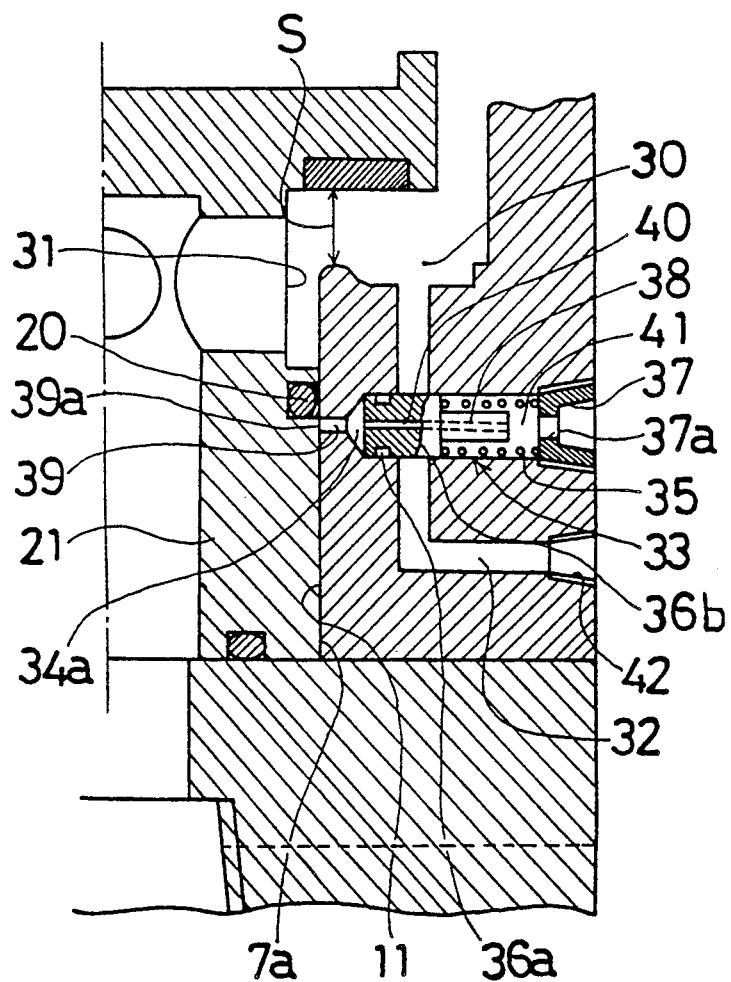
FIG. 6 is a sectional view of the drain valve of FIG. 4, wherein the drain passage is closed.

In FIG. 5, when the valve head 17 leaves the valve seat 12 making a space S between them, the pilot compartment 34a communicates with the large bore 10 via the orifice 39 and the circumferential recess 31. As shown in FIG. 6, after the O-ring gasket 20 traverses a mouth 39a of the orifice 39, the orifice 39 is closed by the tubular body 21. That is, normally, the cylindrical hole 34 communicates with the fluid passage 14 via the circumferential recess 31, the orifice 29, the pilot compartment 34a, and the throttle passage 40 as shown in FIG. 4. However, when the valve 7 leaves the valve seat 12, part of the compressed air flows from the fluid passage 14 into the pilot compartment 34a, acting on the piston as shown in FIG. 5. After the O-ring 20 traverses the orifice 39, the supply of compressed air is stopped. A stopper 38 extends rearward from the piston 36 so that it abuts on the plug 37 when the piston 36 is moved backwardly under the pressure of compressed air in the pilot compartment 34a so that the drain passage 32 opens via the circumferential channel 36a. Normally, the piston 36 is pressed by the compression spring 35 so that the land portion 36b closes the drain passage 32.

A throttle passage 40 is provided through the piston 36 and the stopper 38 so that the cross area of the throttle passage 40 determines the time period during which the compressed air is discharged from the pilot compartment 34a by the action of the compression spring 35. When the valve 7 further moves away from the valve seat 12 and the orifice 39 is closed by the tubular body 21 as shown in FIG. 6, the compressed air in the pilot compartment 34a is gradually discharged via the throttle passage 40 and the vent 37a so that the piston 36 is held for a certain period in the open position in which the drain passage 32 is opened via the circumferential channel 36a.

Alternatively, the pilot compartment 34a may communicate with the large bore 10 via the circumferential recess 31 and the orifice 39 after the valve 7 leaves the valve seat 12. In this case, the compressed air in the pilot compartment 34a is discharged into atmosphere via the circumferential recess 31 and the fluid passage 14 by the action of the compression spring 35.

Figure 3:
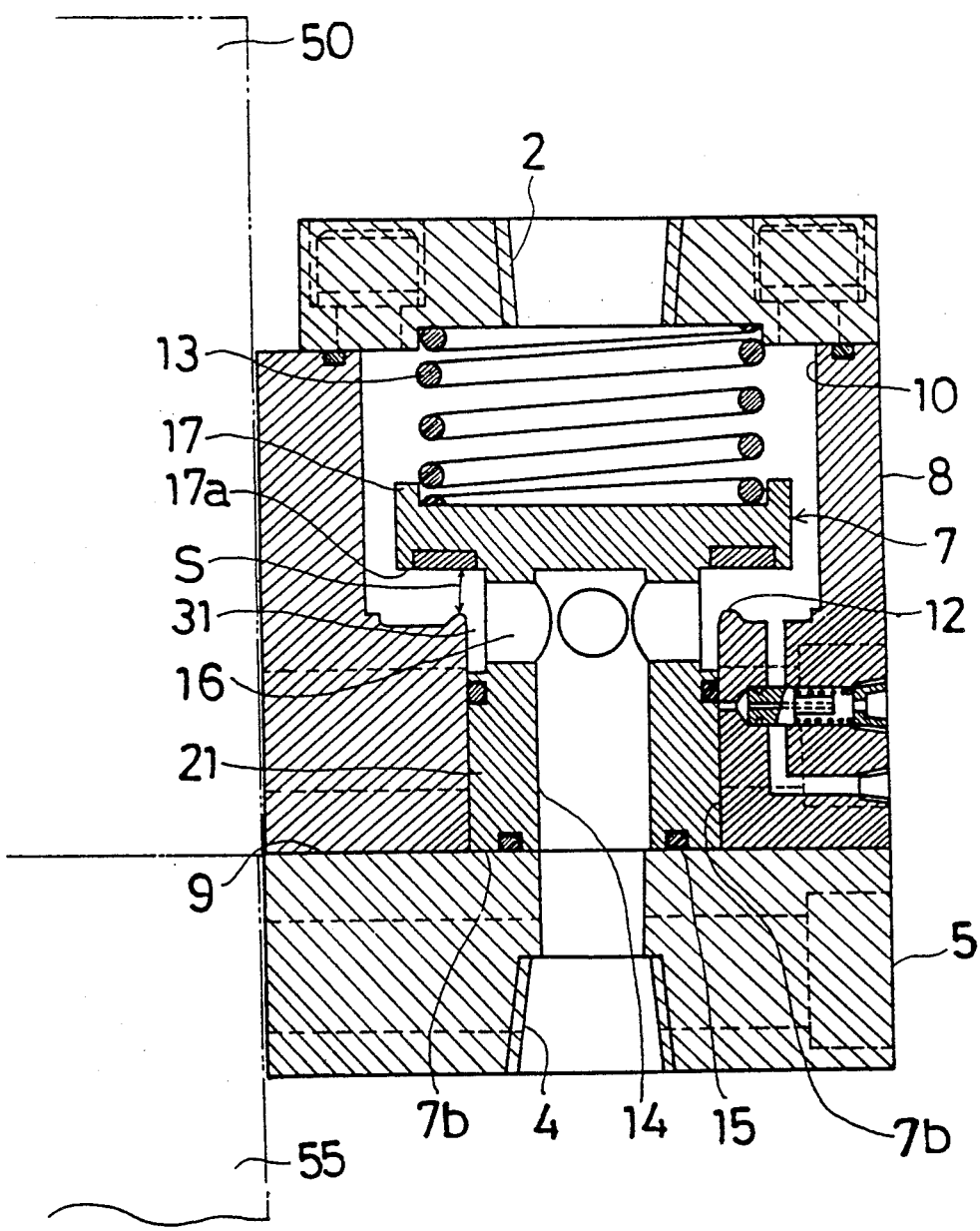
FIG. 3 is a sectional view similar to FIG. 2, wherein the first and second coupling sections are coupled.

The operation of the drain valve will be described. In FIG. 2, the flow of compressed air from the fluid passage 2 is held in the large bore 10 because the valve head 17 is pressed against the valve seat 12 by the compression spring 13. When the second coupling section 50 is advanced, the elastic gasket 15 of the valve 7 abuts upon the contact surface 9 of the second coupling section 5. By applying a force greater than the sum of the push of the compression spring 13 and the pressure of the compressed air on the area of the valve seat 12, the valve head 17 is moved away from the valve seat 12, completing coupling between the first and second coupling sections as shown in FIG. 3. The communication between the fluid passage 14 and the large bore 10 is throttled by the space S between the valve head 17 and the valve seat 12. However, the circumferential recess 31 is provided on the outer surface 7a of the tubular body 21 so that the opening area, which is determined by 10 multiplying the space S (traveling distance of the valve 7) by the circumference of the valve seat 12, is sufficient to connect the radial openings 16 and the large bore 10. Thus, the fluid passage 2 of the first coupling section 8 and the fluid passage 4 of the second coupling section 5 are connected via the large bore 10, the radial openings 16, and the fluid passage 14 so that the compressed air remaining in the large bore 10 is supplied to the fluid passage 4 via the radial openings 16 and the fluid passage 14.

When the coupling action is not performed for a long period, vapor of the compressed air in the large bore 10 condenses and deposits on the compression spring 13 and the surface of the large bore 10, forming a drain. The drain flows downwardly into the collector recess 30. When the next coupling action is performed, the drain is discharged via the drain passage 32 by the drain valve 33.

The operation of the drain valve 33 will now be described. As shown in FIG. 5, when the valve head 17 leaves the valve seat 12, the compressed air flows from the large bore 10 to the fluid passage 14 via the space S between the valve head 17 and the valve seat 12, the circumferential recess 31, and the radial openings 16. Part of the compressed air flows into the pilot compartment 34a via the orifice 39 to push the piston 36 to the right. The volume of the pilot compartment 34a is so smaller than that of the compressed air in the large bore 10 that as soon as the valve head 17 leaves the valve seat 12, the compressed air acts on the pilot compartment 34a to instantly operate the piston 36, thereby opening the drain passage 32 via the circumferential channel 36a. Since the stopper 38 of the piston 36 abuts on the plug 37, the circumferential channel 36a is placed at such a position that the drain passage 32 is opened via the circumferential channel 36a. Thus, as soon as the drain passage 32 opens, the drain in the collector recess 30 is discharged into atmosphere from the discharge port 42 under the pressure of the compressed air 10 in the large bore 10.

As shown in FIG. 6, when the valve head 17 is further separated from the valve seat 12 so that the space S becomes larger, the O-ring 20 passes the orifice 39 to cut off the communication with the circumferential recess 31. Consequently, the compressed air in the pilot compartment 34a is gradually discharged via the throttle passage 40 by the action of the compression spring 35 so that the air pressure is maintained for a certain time which is determined by the cross sectional area of the throttle passage 40, the volume of the pilot compartment 34a, and the push of the compression spring 35. Thus, the piston 36 is kept in place in FIG. 5 for the certain time to discharge the drain from the collector recess 30 via the drain passage 32. When the air pressure in the pilot compartment 34a drops after the certain time, the piston 36 is returned by the action of the compression spring 35 so that the drain passage 32 is closed with the land portion 36b of the piston 36, thus stopping the drain discharge.

When the first member 50 is moved upwardly in FIG. 3, the valve 7 is moved downwardly with respect to the first coupling section 8 by the action of the compression spring 13, and the O-ring 20 passes again the orifice 39 so that the compressed air acts on the pilot compartment 34a via the circumferential recess 31. Consequently, the piston 36 is pushed to the right against the action of the compression spring 35. However, the flow of compressed air is cut off when the valve head 17 rests on the valve seat 12. When the valve 7 leaves the contact surface 9 of the second coupling section 5, the compressed air in the fluid passage 14 escapes into atmosphere so that the time period in which the piston 36 is moved is so short that the drain passage 32 is not opened to discharge any drain.

Figure 7:
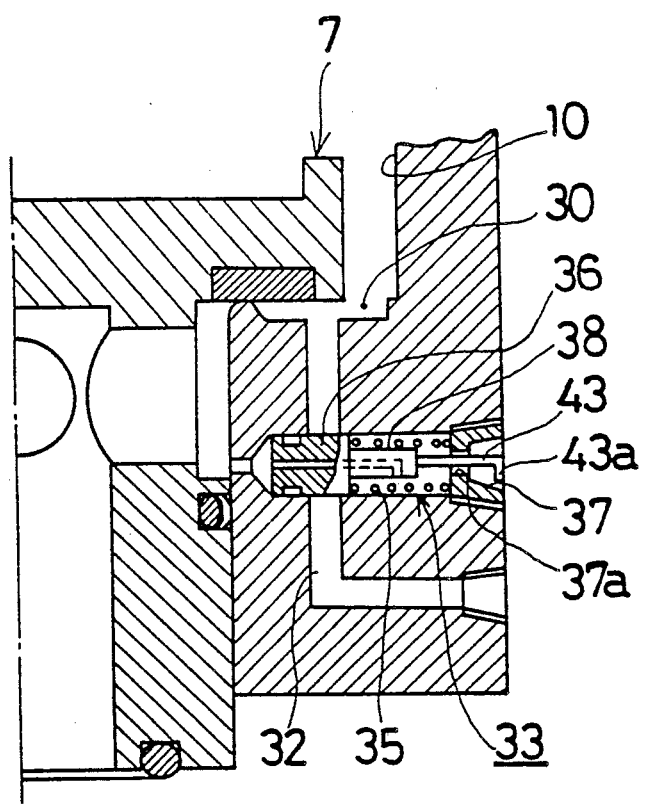
FIG. 7 is a sectional view of a drain valve according to another embodiment of the invention.

In FIG. 7, a manual control is added to the drain valve 33 according to another embodiment of the invention. A rod 43 attached to the stopper 38 is projected through the vent 37a of the plug 37. When the machine which has been in rest for a long period so that a large amount of drain deposits in the collector recess 30 is to be put into operation, the hook 43a of the rod 43 is pulled to move the piston 36 to the right against the action of the compression spring 35, thereby opening the drain passage 32 to discharge the drain from the collector recess 30. Upon operation, the machine automatically discharges the drain from the large bore 10 in synchronism with the coupling action of the valve 7 as described above. Alternatively, the drain valve 33, which is interlocked with the coupling action of the valve 7 in the above embodiment, may be made so that it is controlled by only the manual control.

Figure 8:
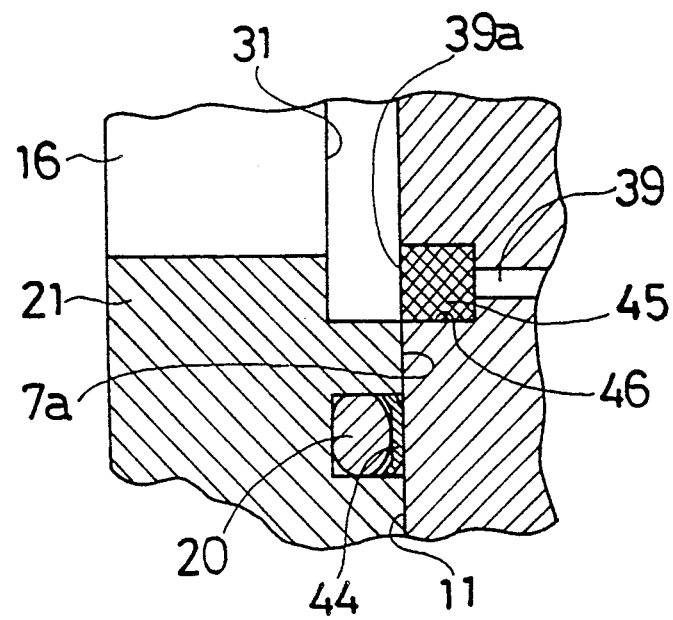
FIG. 8 is an enlarged sectional view of an O-ring and an orifice of a coupling device according to a still another embodiment of the invention.

When the valve head 17 leaves the valve seat 12, the O-ring 20 enters the gap between the tubular body 21 and the small bore 11 under the pressure of compressed air and passes the orifice 39 so that part of the O-ring 20 expands into the orifice 39 and cut off, lowering the sealing function of the O-ring 20. In order to solve this problem, a slipper seal 44 is provided over the O-ring 20 while a filter 45 is placed in a recess 46 which is formed at the mouth 39a of the orifice 39. The surface of the filter 45 is finished to be flash with the surface of the small bore 11 as shown in FIG. 8. Consequently, when the O-ring 20 passes the orifice 39, the slipper seal 44 slides on the filter 45, thereby preventing a deterioration in the sealing action of the O-ring 20.

Figure 9:
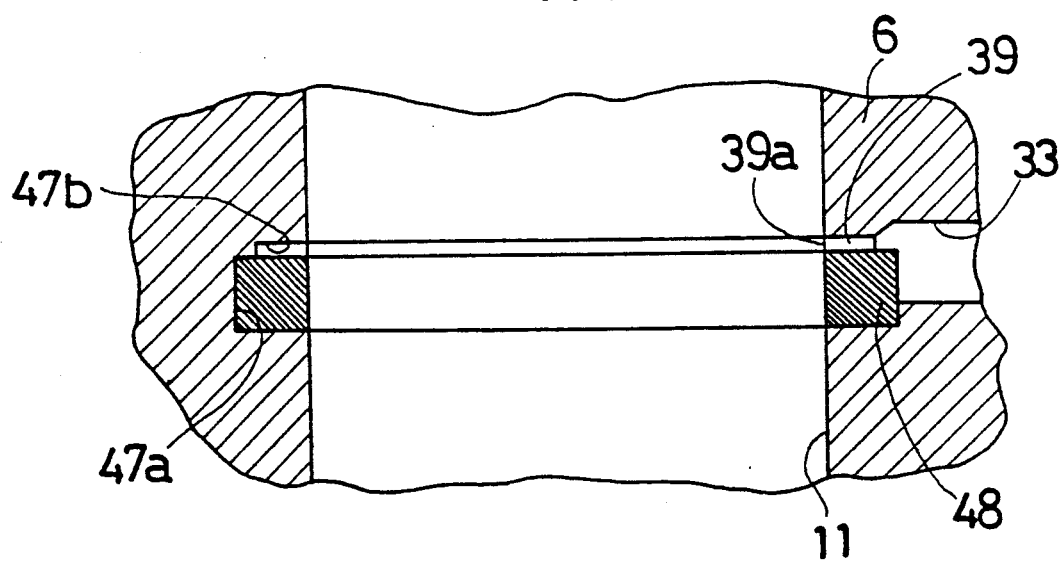
FIG. 9 is an enlarge sectional view useful for explaining how to make an orifice of the coupling device.
Figure 10:
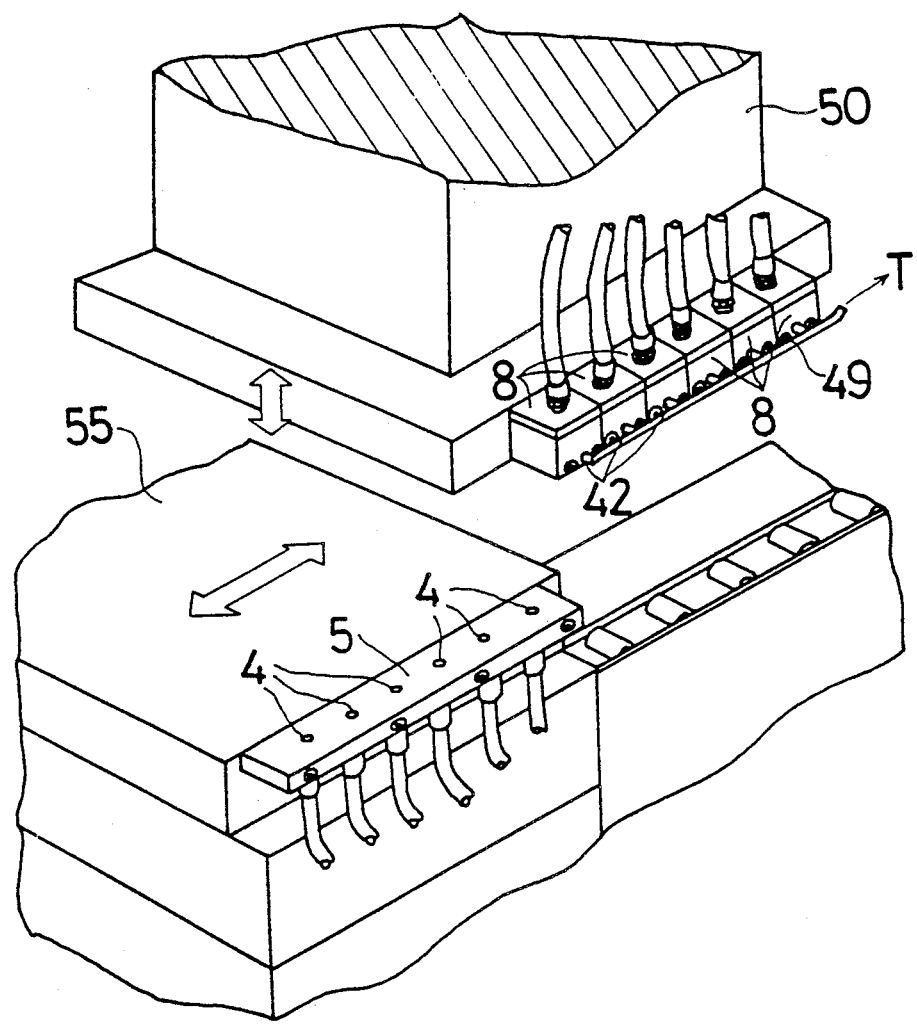
FIG. 10 is a perspective view of part of a press to which a row of coupling devices are attached.
Figure 11:
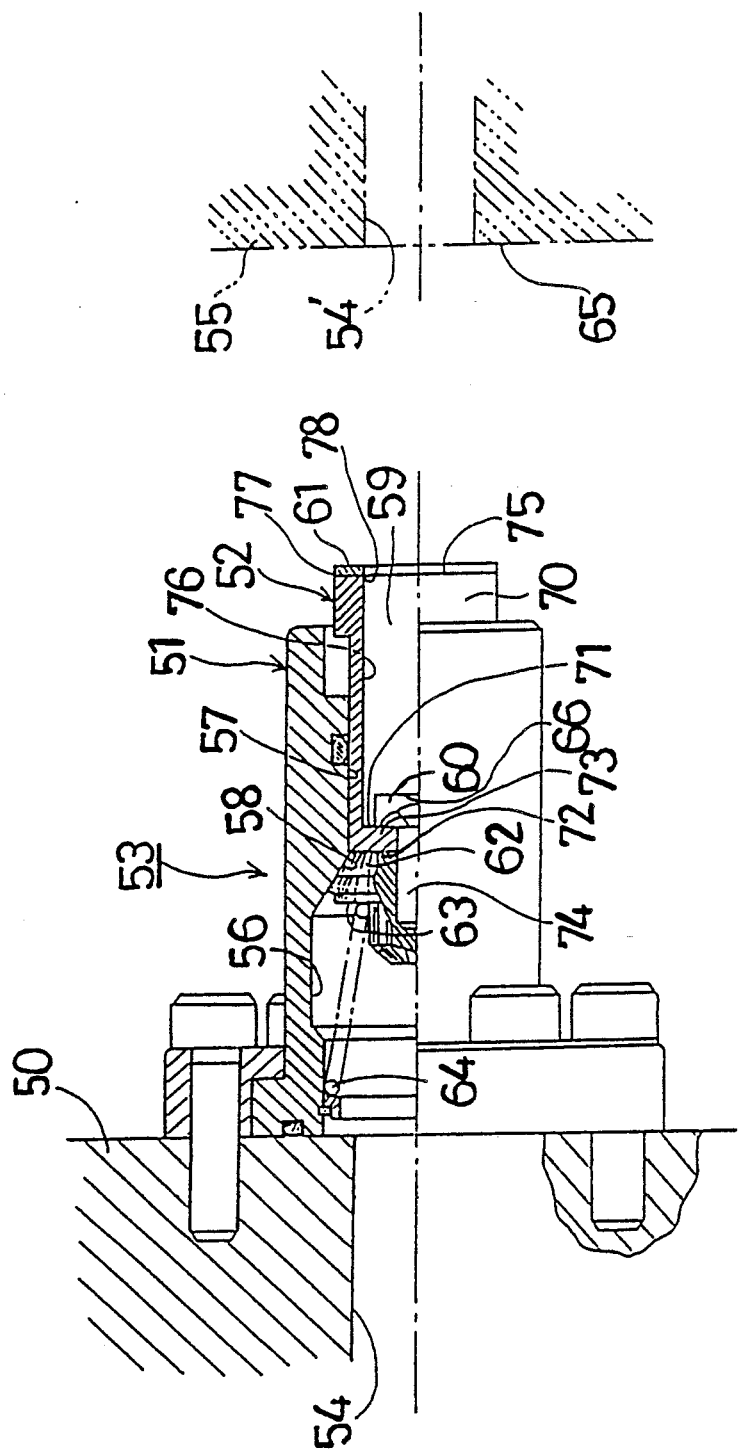
FIG. 11 is a side view, partially in section, of a conventional coupling device.

As shown in FIG. 9, the orifice 39 may be made by forming two circumferential recesses 47a and 47b of different widths on the small bore 11, with a ring member 48 of Teflon or the like placed in the fluid passage 47a which is wider than the other so that the fluid passage 47b serves as the orifice 39. The necessary open area of the orifice 39 is given along the circumference so that the width of the fluid passage 47b is able to be so small that the O-ring 20 cannot expand into the orifice 39. 10 An external pipe (not shown) may be threaded into an internal screw thread 42a provided at the fluid passage 42 so that the discharged drain will not soil the second member 55 and the contact surface 9 of the second coupling section 5. As shown in FIG. 10, the coupling devices are used to couple the air passages of a metal mold of a press. A number of first coupling sections 8 are attached to the plunger 50 of the press while the second coupling sections 5 are attached to the metal mold 55 to be replaced. When the metal mold 55 is placed below the plunger 50, the plunger 50 is lowered so that the first coupling section 8 are brought into close contact with the fluid passage 2 to couple the air passages. The respective drain ports 42 are connected with an external pipe 49 so that the drains are discharged into a single tank T for providing efficient recycling of the drains.

Although the first coupling sections 8 are attached to the first member 50 in the vertical position in the above embodiment, they may be attached in the horizontal position as in the conventional way, with the drain ports 42 oriented downwardly. The second member 55 with a fluid passage 4 opening at a contact surface 9 may be used as the second coupling section 5. The 3 cover may be eliminated, with the body 6 attached directly to the first member 50 as in the conventional way.

With the coupling device according to the invention includes a drain passage provided along the small bore and a drain valve consisting of a cylindrical hole extending perpendicular to the drain passage and a piston reciprocating in the cylindrical hole, it is possible to provide the drainage on the side wall of the existing small bore which has been not utilized. With the drain valve having a pilot compartment communicating with the small bore via an orifice and a compression spring for pressing the piston so that when the valve leaves the seat, part of the compression air flows into the pilot compartment via the orifice to push the piston against the action of the compression spring, thereby opening the drain passage while when the valve rests on the seat, the drain passage is closed by the action of the compression spring, it is possible to control the opening of the drain passage in synchronism with the coupling action of the valve, thereby discharging the drain from the large bore.

For example, when the coupling devices are used to couple the air conduits of a metal mold in a press as shown in FIG. 10, those that are not used for a long period due to the type of a metal mold are able to discharge the drains as soon as the metal mold with the second coupling sections is replaced without stopping the operation of the press.

Since the throttle passage is provided through the piston for communicating the pilot compartment and the spring compartment so that when the orifice of the pilot compartment is closed by the tubular body of the valve, the compressed air in the pilot compartment is discharged by the action of the spring thereby keeping the drain passage open for a predetermined time to discharge the drain from the large bore.

Since the rod extends rearwardly from the rear end of the piston through the vent, it is possible to discharge the drain independently of the coupling action of the valve by manually controlling the rod. For example, the piston is moved manually to discharge the drain before operation of a machine and, thereafter, the machine automatically discharges the drain in synchronism with the coupling action of the valve. Since the drain port is able to be connected to an external pipe, the drain discharge is not spread into atmosphere and does not soil the adjacent machine part.

We claim:

1. A coupling device comprising:
   a first coupling section to be attached to a first member with a first bore and having a large bore, a small bore, and a valve seat between said large and small bores;
   a second coupling section to be attached to a second member and having a second bore opening at a contact surface which is opposed to said first coupling section;
   a valve having a valve head normally resting on said valve seat and a tubular body snugly fitted in said small bore and having an axial opening with a mouth at an end and a plurality of radial openings at the other end so that they communicate with said large bore when said valve head leaves said valve seat;
   a drain passage provided along said small bore and having an end opening at a bottom of said large bore and the other end opening at a lower side of said first coupling section; and
   a drain valve provided in said drain passage and having a cylindrical hole intersecting said drain passage and a piston snugly fitted in said cylindrical hole and having a circumferential channel for opening said drain passage and a land portion for closing said drain passage.

2. The coupling device of claim 1, wherein said cylindrical hole has a pilot compartment on a side of said piston and a spring compartment on the other side of said piston, said pilot compartment having an orifice through which it communicates with said small bore and said spring compartment having a compression spring for biasing said piston so that when said valve head leaves said valve seat, compressed air flows into said pilot compartment via said orifice and acts on said piston against the action of said compression spring, thereby opening said drain passage while when said valve head rests on said valve seat and said pilot compartment communicates with atmosphere via said orifice and said radial and axial openings, said piston is retreated by the action of said compression spring to close said drain passage.

3. The coupling device of claim 2, wherein said piston has a throttle passage there through so that when said valve head leaves said valve seat and said orifice is closed by said tubular body, compressed air in said pilot compartment is discharged into atmosphere via said throttle passage by the action of said compression spring thereby keeping said piston at a position for opening said drain passage for a predetermined time.

4. The coupling device of claim 1, which further comprises a manual control having a rod extending rearwardly from an end of said piston and a hook portion at a free end, whereby said piston is able to be moved by pulling said hook portion to a position for opening said drain passage.

5. The coupling device of claim 1, wherein said body is provided with a drain port at a mouth of said drain passage, said drain port is provided with a coupling so that an external pipe is connected to direct a drain discharge.

* * * * *